Aug. 10, 1954　　　H. W. FORRER　　　2,685,999
BOTTLE CARRIER

Filed Oct. 2, 1950　　　　　　　　　5 Sheets-Sheet 1

INVENTOR.
HOMER W. FORRER
BY Parrott, Richards & Sims
ATTORNEYS

Aug. 10, 1954     H. W. FORRER     2,685,999
BOTTLE CARRIER
Filed Oct. 2, 1950     5 Sheets-Sheet 2
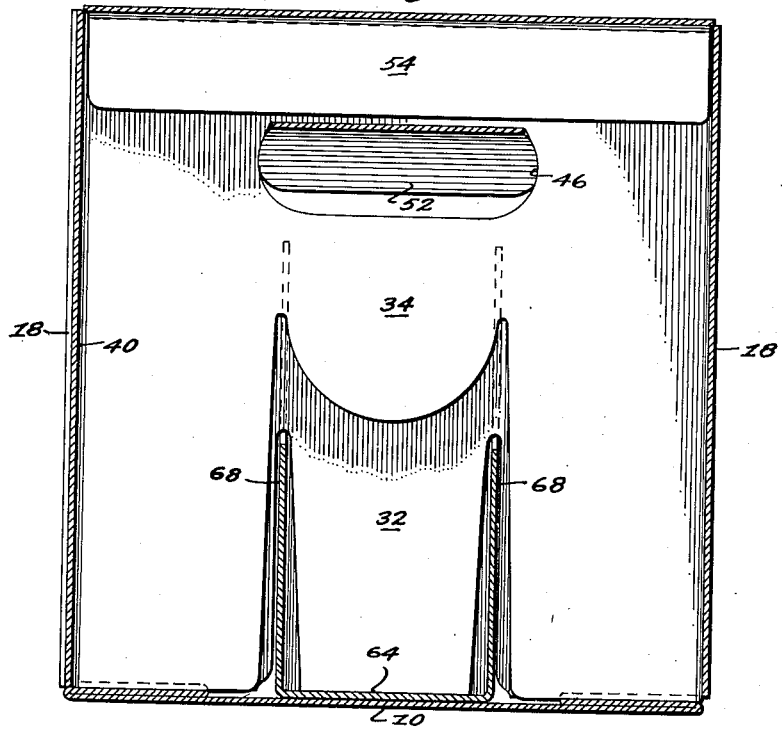
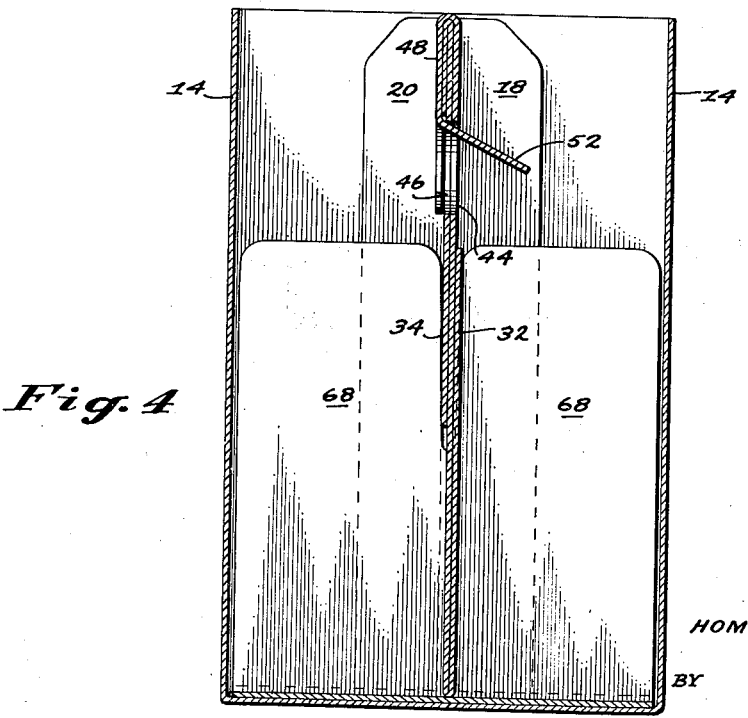
INVENTOR.
HOMER W. FORRER Aug. 10, 1954     H. W. FORRER     2,685,999
BOTTLE CARRIER Filed Oct. 2, 1950     5 Sheets-Sheet 4

INVENTOR.
HOMER W. FORRER
BY

Parrott, Richards & Sims
ATTORNEYS

INVENTOR.
HOMER W. FORRER
BY
Parrott, Richards & Sims
ATTORNEYS

Patented Aug. 10, 1954

2,685,999

UNITED STATES PATENT OFFICE 2,685,999

BOTTLE CARRIER

Homer W. Forrer, Atlanta, Ga., assignor to Atlanta Paper Company, a corporation of Georgia Application October 2, 1950, Serial No. 187,993

2 Claims. (Cl. 229—28)

This invention relates to bottle carriers, and more particularly to an improved form of paperboard bottle carrier that is adapted to meet the required specifications, and is especially well suited, for use in the interstate shipment of bottles.

In instances, such as the distribution of malt beverages, where interstate shipments of bottled goods are to be made, the usual type of bottle carrier employed for local distribution cannot be used because it does not provide adequate protection for the bottles. Federal specifications, as a matter of fact, require that a thickness equivalent to at least 40 point paperboard be provided between bottles that are to be shipped in interstate commerce, while cost considerations limit the thickness of paperboard that may be used feasibly in a bottle carrier to about 20 point, and, moreover, no attempt is usually made in the bottle carriers employed for local distribution to separate the bottles completely by partitions.

According to the present invention, a paperboard carrier structure is provided which may be constructed almost entirely from the 20 point paperboard regularly used in the manufacture of bottle carriers, and which incorporates a novel partition arrangement allowing paperboard of this thickness to be disposed for complete separation of bottles in the carrier in full compliance with all practical and specified requirements of interstate shipment.

The bottle carrier of the present invention is described further below in connection with the accompanying drawings in which.

Figure 1:
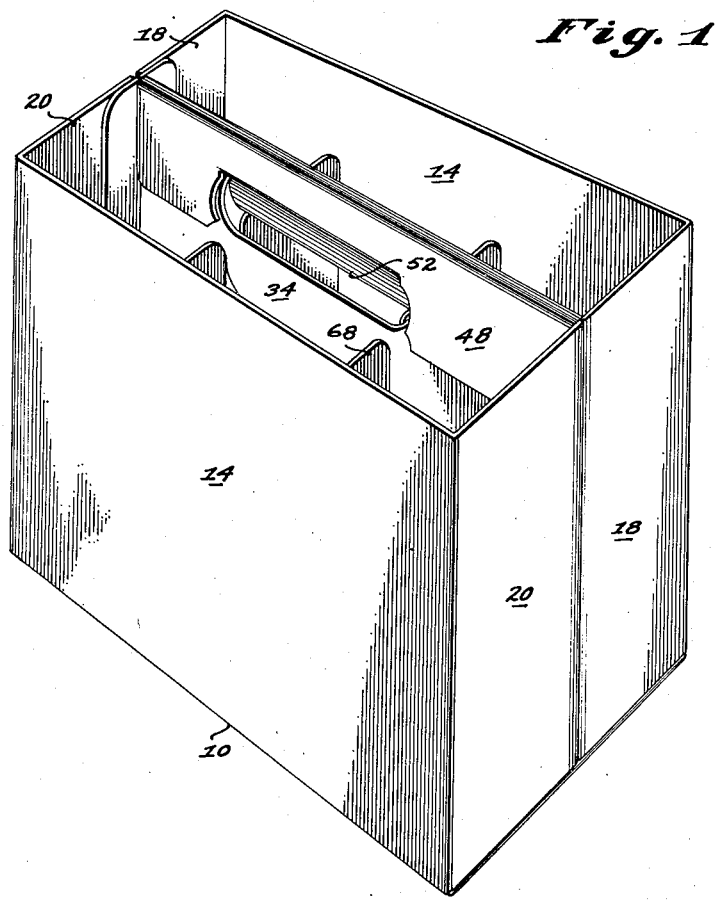
Fig. 1 is a perspective view of a bottle carrier constructed in accordance with the present invention.
Figure 2:
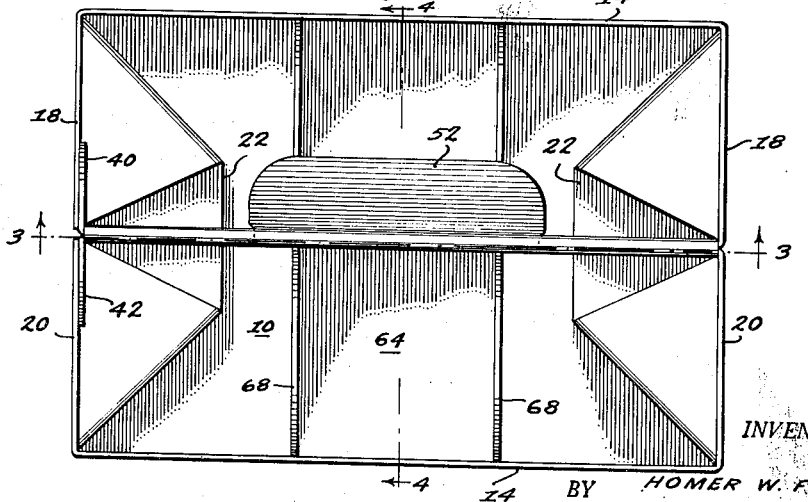
Fig. 2 is a plan view of the bottle carrier shown in Fig. 1.
Figure 5:
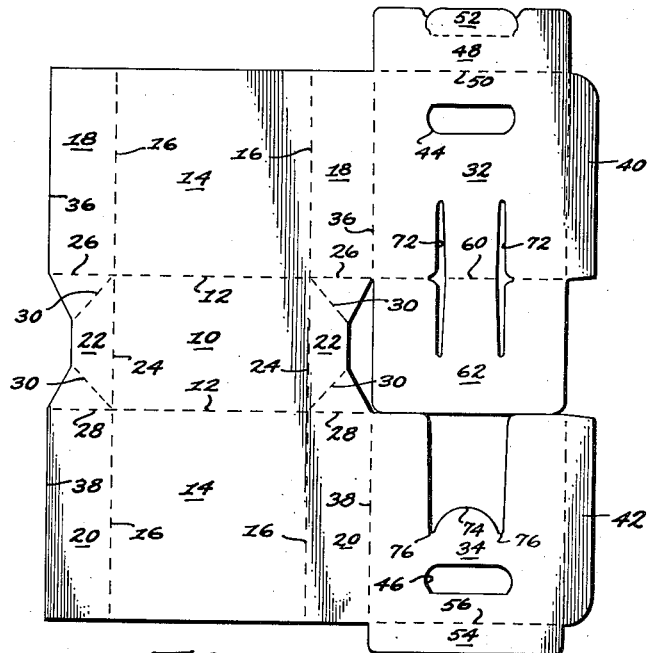
Figure 6:
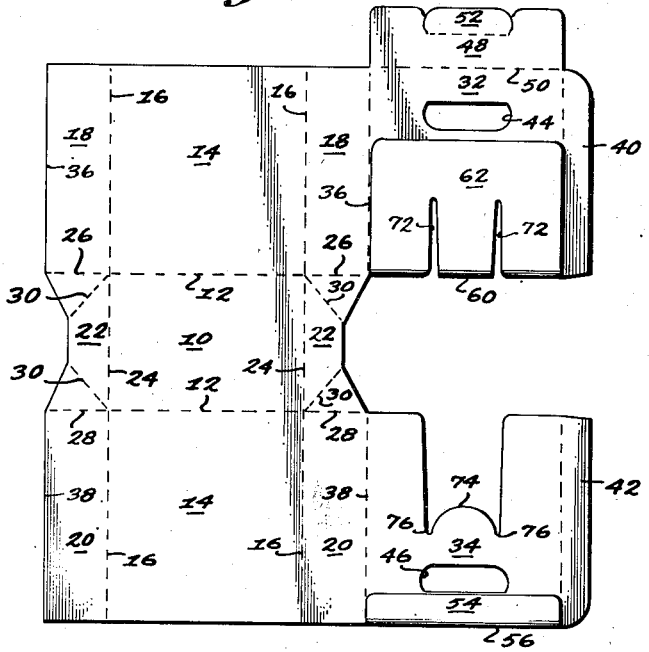
Figure 7:
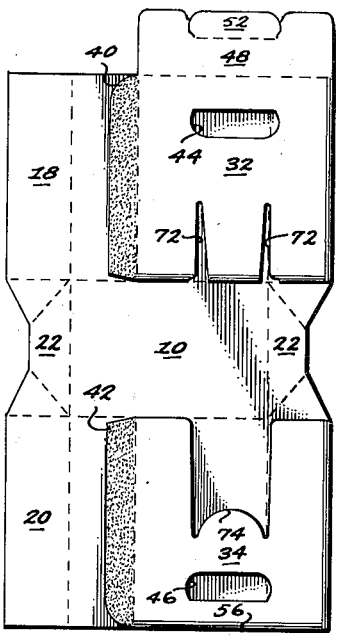
Figure 8:
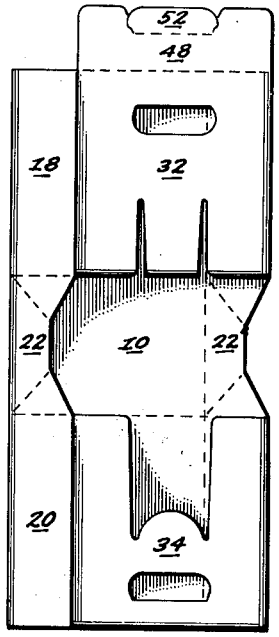
Figure 9:
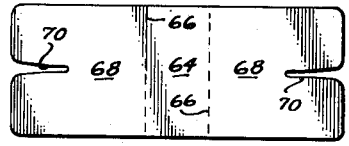
Figure 10:
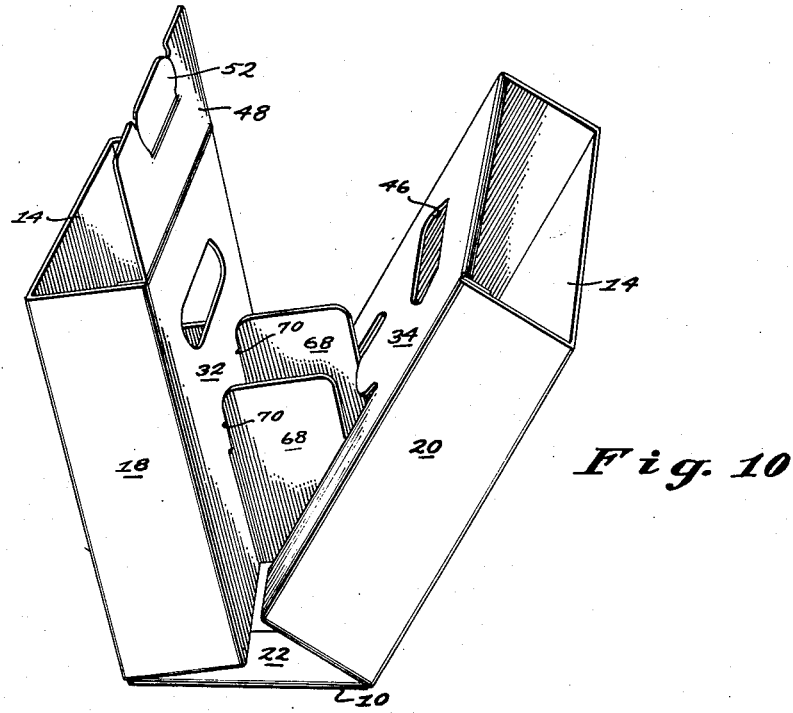
Figure 11:
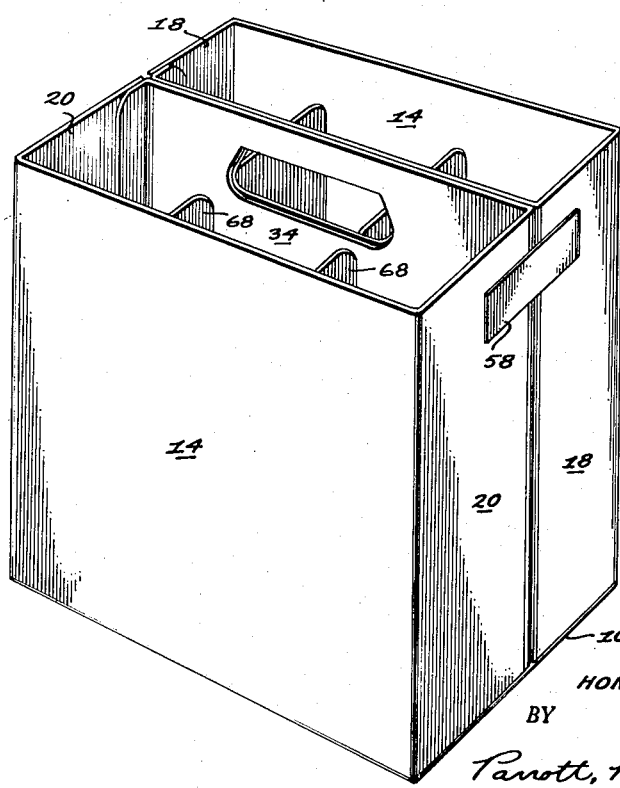

Figs. 3 and 4 are vertical sections taken, respectively, on the lines 3—3 and 4—4 in Fig. 2;

Fig. 5 is a plan view of a blank for forming the carrier illustrated in Figs. 1 to 4, inclusive;

Figs. 6, 7 and 8 are corresponding plan views illustrating progressively the manner in which the blank shown in Fig. 5 is folded and glued for erection to form the carrier shown in Figs. 1 to 4, inclusive;

Fig. 9 is a plan view of a blank for a transverse partition element such as is employed with the bottle carrier of the present invention;

Fig. 10 is a transverse vertical section illustrating the erection of the carrier from the folded and glued blank shown in Fig. 8, with a transverse partition blank, as shown in Fig. 9, in place; and Fig. 11 is a further perspective view corresponding generally to Fig. 1 and illustrating a somewhat modified form of the carrier of the present invention.

Referring now in detail to the drawings, the bottle carrier structure of the present invention, as shown, comprises a one-piece bottom wall 10 having its side edges, as at 12, foldably joined to opposed side walls 14; which have each of their side or end edges 16 foldably joined to end wall half-laps 18 and 20 that extend to meet medially of the carrier and thereby form opposed end walls in relation to said bottom wall 10 when the carrier is in erect position.

To stabilize and strengthen this wall structure with respect to the bottom wall 10, web panels 22 are preferably employed as disclosed in co-pending application Serial No. 185,008, filed September 15, 1950. These web panels 22 are foldably joined at each end edge 24 of the bottom wall 10 and at the bottom edges 26 and 28 of the respective end wall half-laps 18 and 20 that form the adjacent end wall. The web panels 22 are further formed with fold lines 30 extending diagonally from the adjacent corners of the bottom wall 10 and the respective end wall half-laps 18 and 20 so they are adapted for doubling in overlying relation with respect to the bottom wall 10 upon erection of the carrier, the web panels 22 being proportioned so that their doubled width does not exceed the width of the end compartments of the carrier (compare Fig. 2, for example).

The arrangement of the web panels 22 for doubling in this manner serves to dispose the end wall half-laps 18 and 20 in fixed alignment with the end edges 24 of the bottom wall 10 as the carrier is erected and thereby effectively stabilizes the wall structure of the carrier in erect position. In addition, the overlying disposition of the doubled web panels 22 when the carrier is erected results in reenforcing substantially the bottom wall 10 and providing protection for the bottoms of bottles disposed in the end carrier compartments, just as such protection is provided in the central compartments by the transverse partition element employed as will be explained in further detail presently.

The carrier structure of the present invention further comprises medial partition panels 32 and 34, one of which is foldably secured at and thereby connects the extending edges 36 or 38, respectively, of both of the end wall half-laps 18 or 20 that are joined to each of the side walls 14, so that these medial partition panels 32 and 34 are positioned in back-to-back relation upon erection of the carrier for forming a multi-ply medial partition from which the carrier may be suspended for carrying, and by which a complete longitudinal separation of bottles in the carrier may be effected.

The medial partition panels 32 and 34 may be secured to the end wall half-laps 18 and 20 in this manner, as shown in the drawings, by foldably joining them respectively to the extending edge 36 or 38 of one of the end wall half-laps 18 or 20 joined to each side wall 14, and forming them with glue flaps as at 40 and 42 for securing to the extending edge 36 or 38 of the other end wall half-lap 18 or 20 that is joined to the same side wall 14.

To provide handle means in the multi-ply medial partition formed by the partition panels 32 and 34, each of these panels 32 and 34 may be formed with a hand hold aperture, as at 44 and 46, adjacent their top edges, and one of the panels (such as 32) may be provided with an auxiliary panel 48 foldably joined at the top edge 50 of this panel 32 and formed with a flap member 52 corresponding substantially to the outline of the hand hold apertures 44 and 46, so that the auxiliary panel 48 may be folded over the other partition panel 34 to allow the flap member 52 to be extended through the hand hold apertures 44 and 46 for securing the partition panels 32 and 34 in back-to-back relation and maintaining the carrier erect. The partition panel 34 may also be formed, if desired, with a relatively narrow auxiliary panel 54 foldably joined at its top edge 56 for further stiffening and adding to the body of the handle portion of the medial carrier partition.

The carrier can also be maintained erect with the medial partition panels in back-to-back relation by applying to the pair of end wall half-laps 18 and 20 at each end of the carrier an adhesively coated tape as illustrated at 58 in Fig. 11. As shown, the tape 58 should be applied adjacent the top edges of the half-laps 18 and 20 and should extend for a distance of about an inch or so on each side of the point at which the half-laps 18 and 20 meet medially of the carrier. Various types of transparent or decorated tapes are available that might be applied in this manner, and their use offers the particular advantage of firmly and effectively securing the carrier in erect position against the possibility of accidental displacement of handle flaps, as previously described above, which might allow inadvertent collapsing of the carrier. If tape as at 58 were used to secure the carrier in erect position, then no auxiliary panel 48 as described above would be needed, and both partition panels 32 and 34 might be formed merely with stiffening panels such as the panel 54 noted above.

As already mentioned, the multi-ply medial partition for the carrier, that is formed by the partition panels 32 and 34, also serves to provide complete bottle separation longitudinally of the carrier. For this purpose, at least one of the partition panels (such as 32) is proportioned so that its bottom edge 60 extends downwardly to the bottom wall 10 when the carrier is in erect position, and a flap member or panel 62 is foldably joined at this bottom edge 60 for doubling in face-to-face relation with respect to the panel 32 in a height at least as great as the height at which bottles to be loaded in the carrier begin to neck. This arrangement provides longitudinally between the bottles at least two thicknesses of the paperboard from which the carrier is formed so as to satisfy the requirements for protection of the bottles, and accordingly allows wide latitude in notching the other medial partition panel 34 for assembly to the best advantage with a transverse partition element for the carrier as described below.

A transverse partition element is employed according to the present invention to provide the necessary lateral separation for the bottles by compartmenting the carrier into individual bottle cells. This transverse partition element is the only portion of the carrier structure that needs to be formed of heavier than regular paperboard, 40 point paperboard being used to form this element in order to complete the necessary protection for the bottles. As shown in the drawings, it comprises a central panel 64 of bottle width which is adapted to rest on the bottom wall 10, and which is foldably joined at its side edges 66 to transverse partition panels 68 arranged for upstanding disposition with respect to the central panel 62.

Both of these transverse partition panels 68 are formed at their top edges with downwardly extending notches as at 70, and the panel elements forming the multi-ply medial carrier partitions are in turn formed at their bottom edges with upwardly extending notches for interlocking with the notches 70 in the transverse partition panels 58 and thereby providing means for securing the transverse partition element in place in the carrier when it is erected. In the medial partition panel 32 and its foldably joined flap member 62, the upwardly extending notches are formed by slots as at 72 extending on both sides of the bottom edge 60 of panel 32, while in the medial partition panel 34 a major part of the central portion of the panel is removed to clear the transverse partition element easily during erection of the carrier, with only a relatively short extending tongue 74 left to form notches as at 76 for engaging the transverse panel notches 70 after the carrier is erected.

The form of blank used in accordance with the present invention for constructing a carrier such as is described above is shown in Fig. 5. In constructing the carrier from this blank, the first step is to fold upwardly the flap member or panel 62 and the narrow auxiliary panel 54 about the bottom edge 32 of the medial partition panel 32 and the top edge 56 of the medial partition 34, respectively, as shown in Fig. 6. Then the medial partition panels 32 and 34 themselves are folded over to the left, as seen in Fig. 7, about the extending edges 36 and 38 of the end wall half-laps 18 and 20 to which they are joined, and a coating of adhesive is applied to the exposed faces of the glue flaps 40 and 42 as indicated by stippling; and, finally, the opposite or left hand end wall half-laps are folded over to the right, as seen in Fig. 8, and thereby secured by the above noted adhesive application to the glue flaps 40 and 42 to form the carrier structure in collapsed position for association upon erection with a transverse partition element having a blank form such as is shown in Fig. 9.

The manner in which this association is carried out in erecting the carrier is illustrated further in Fig. 10, in which the carrier structure is shown with the medial partition panel 34 being moved over the top edges of the transverse partition panels 68 to complete the erection. It will be noted that as this is done, the medial partition panel 34 is disposed so that the vertical distance from the bottom wall 10 to the top of the notches 76 is great enough to be started freely over the top edges of the transverse partition panels 68, which allows this medial partition panel 34 to be flexed easily into place with its notches 76 engaging the transverse panel notches 70.

When the carrier structure is erected, the bottle compartments are all separated by partitions having a thickness equivalent at least to 40 point paperboard as already noted. It should also be noted that the carrier structure is such that the side walls 14, end wall half-laps 18 and 20, and multi-ply medial partition may all be formed in a height at least as great as the height of the bottles with which the carrier is loaded, which has the important advantage of allowing the contents of the bottles to be substantially protected from light in cases where such protection is desired; and if more complete protection against light is needed, foldable lid members (not shown) might be readily added to the side walls 14 similarly to the arrangement disclosed in copending application Serial No. 187,995, filed October 2, 1950.

I claim:

1. A paperboard bottle carrier comprising a bottom wall, opposed side walls foldably joined to said bottom wall, end wall half-laps foldably joined at each side edge of each of said side walls and extending therefrom, medial partition panels foldably secured at and thereby connecting the extending edges of the end wall half-laps joined to each of said side walls, whereby said medial partition panels are positioned in back-to-back relation for forming a multi-ply medial partition from which said carrier may be suspended for carrying, one of said partition panels having a bottom edge extending downwardly to the bottom wall of said carrier and having a flap member foldably joined at its bottom edge for doubling in face-to-face relation therewith in a height at least as great as the height at which bottles to be loaded in said carrier begin to neck, the other of said partition panels having a bottom edge in which the central portion thereof terminates short of said bottom wall, and a separate transverse partition element for said carrier formed of paperboard having a thickness at least twice as great as the paperboard from which said carrier is otherwise formed, said transverse partition element comprising a central panel of bottle compartment width adapted to rest on said bottom wall, and transverse partition panels foldably joined at each side edge of said central panel for disposition in upstanding relation with respect to said central panel, said transverse panels being formed at their top edges with downwardly extending notches, and said partition panels and said flap member being formed at the bottom edges thereof with upwardly extending notches for interlocking with said transverse partition panel notches and thereby providing means for securing said transverse partition element in place upon erection of said carrier, the central portion of said other partition panel terminating short of said bottom wall allowing said other bottom wall to be manipulated easily in and out of engagement with said transverse panel notches after said transverse partition panels have first been engaged with said partition panel having a bottom edge extending downwardly to said bottom wall.

2. A paperboard bottle carrier as defined in claim 1 and further characterized in that a web panel is foldably joined at each end edge of said bottom wall and at the bottom edges of the adjacent pair of end wall half-laps, said web panel being formed with fold lines extending diagonally from the adjacent corners of said bottom and end wall half-laps for doubling in overlying relation to said bottom wall upon erection of said carrier and thereby disposing said end wall half-laps in fixed alignment with the end edges of said bottom wall, the doubled width of said web panels overlying said bottom wall from each end edge thereof in an extent exceeding half the width of the end bottle compartments of the compartments formed in said carrier by said transverse partition element, and said web panels thereby serving to reinforce the bottom wall at said end compartments comparably to the reinforcement afforded by the central panel of said transverse partition element for the central compartments formed thereby.

References Cited in the file of this patent

UNITED STATES PATENTS

| Number | Name | Date |
|---|---|---|
| 437,042 | Peck | Sept. 23, 1890 |
| 2,413,315 | Darragh et al. | Dec. 31, 1946 |
| 2,458,281 | Lupton | Jan. 4, 1949 |
| 2,535,741 | Lighter | Dec. 26, 1950 |
| 2,576,179 | Holy | Nov. 27, 1951 |
| 2,586,301 | Castle | Feb. 19, 1952 |
| 2,598,920 | Keith | June 3, 1952 |